3 Sheets—Sheet 3.
M. T. BOULT.
LATHE-CHUCKS FOR TURNING OVALS.
No. 174,467. Patented March 7, 1876.
Fig. 7. Fig. 8.
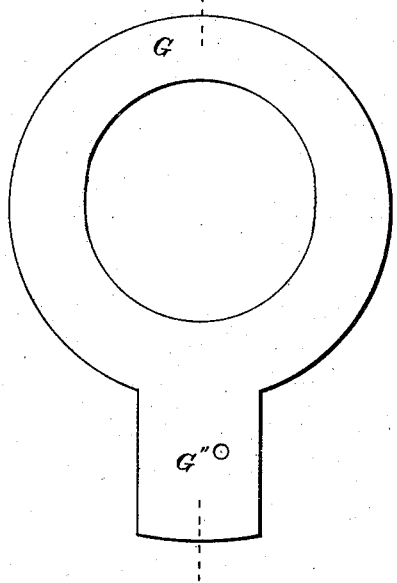
Fig. 9.
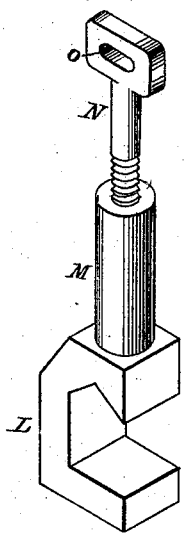
Fig. 10.
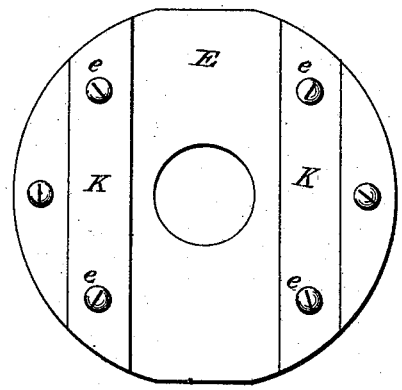
Attest:
J. E. Harding
M. Teneyck
Inventor:
Myron T. Boult
N. PETERS, PHOTO-LITHOGRAPHER, WASHINGTON, D. C.

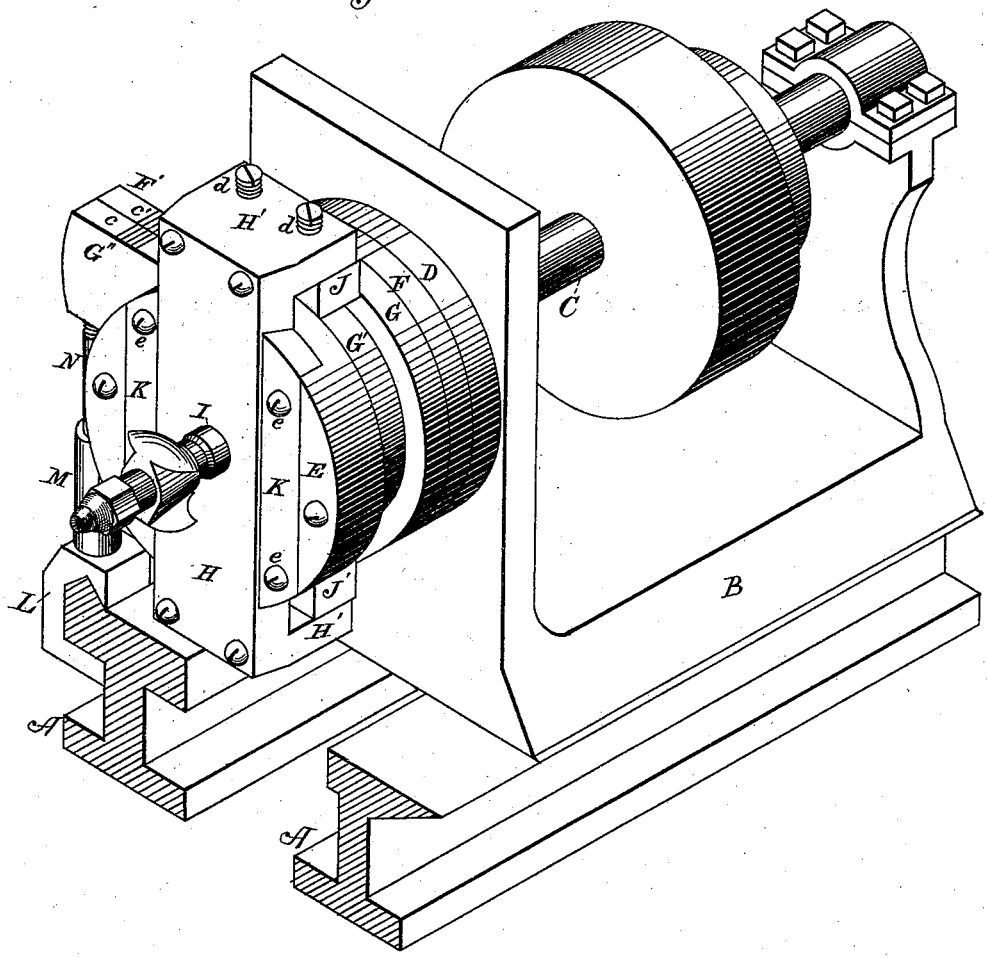

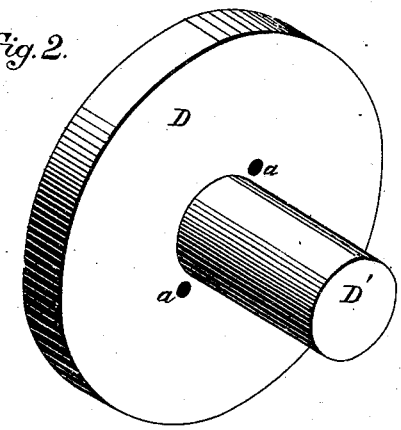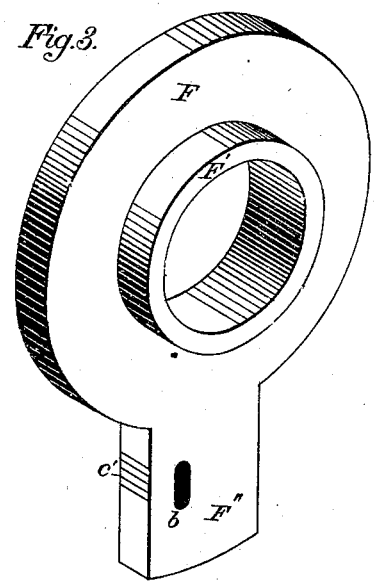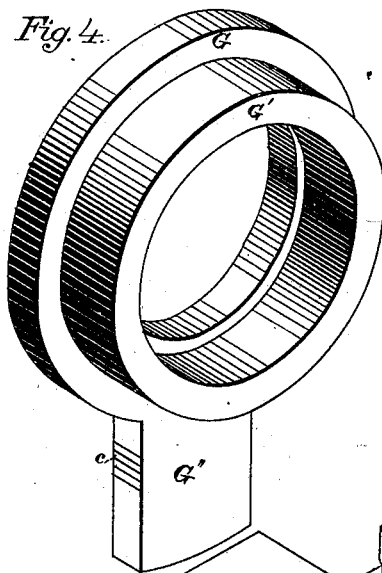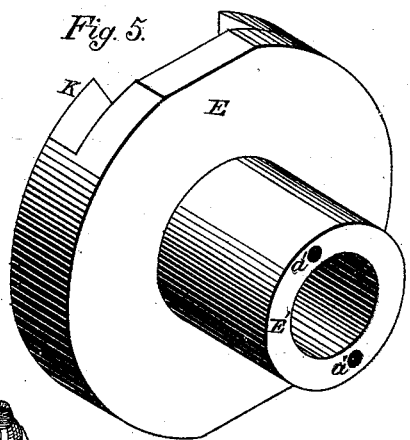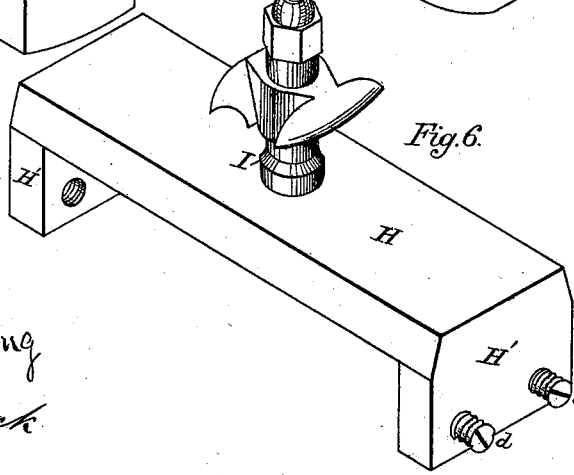

UNITED STATES PATENT OFFICE.

MYRON T. BOULT, OF BATTLE CREEK, MICHIGAN.

IMPROVEMENT IN LATHE-CHUCKS FOR TURNING OVALS.

Specification forming part of Letters Patent No. 174,467, dated March 7, 1876; application filed August 4, 1875.

*To all whom it may concern:*

Be it known that I, MYRON T. BOULT, of Battle Creek, in the county of Calhoun and State of Michigan, have invented a new and useful Improvement in Lathe-Chucks for Turning Ovals; and I hereby declare the following to be such a full, clear, and exact description thereof, as will enable others skilled in the art to which it pertains to construct the same, reference being had to the accompanying drawings making a part of this specification, and to the letters of reference marked thereon, similar letters indicating corresponding parts in the different figures.

This invention relates to that class of devices which, by their attachment to ordinary lathes, enable them to form articles having an elliptical or oval perimeter, the object being to produce articles having a form more agreeable to the eye than would be the circle or polygon, or, as in the present application of it, as shown in the drawings, and hereinafter described, to the production of a tool in common use by carvers and other workers in wood; and the invention consists in the novel combination and arrangement of parts, as will be hereinafter fully set forth, and then specifically pointed out in the claims.

In the accompanying drawings, Figure 1 is a perspective view of the device applied to a lathe. Fig. 2 represents the back plate of the chuck, which is secured to the face-plate of the lathe. Fig. 3 is the carrying-plate of the chuck. Fig. 4 shows the cam-plate in perspective; Fig. 5, the face-plate of the chuck; Fig. 6, the reciprocating carrier, to which the article to be turned is attached. Figs. 7 and 8 are a plan and section of the cam-plate. Fig. 9 shows the holding-jack by which the cam-plate is retained in the desired position. Fig. 10 is a front view of the face plate of the chuck and its adjusting pieces.

A is the lathe-bed, upon which the head-block B is carried. These, together with the lathe-spindle C, and its driving-pulleys or other mechanism for producing rotation, may be of the ordinary construction in common use. The back plate D of the chuck is secured to the face-plate of the lathe by suitable screws, or, if preferred, may be attached directly to the lathe-spindle. It is provided with a projecting stud, D', of sufficient strength and rigidity to carry the remaining parts of the chuck, and the article being turned, with such steadiness as to prevent chattering, and the consequent defacement of the work. Over this stud, and revolving with it, is the sleeve E' of the chuck face-plate E, it being secured to the plate D by screws passing through the holes $a$ in the plate D, and entering corresponding holes in the sleeve. By this arrangement the distance between the back plate and the face-plate of the chuck may always be adjusted to suit the thickness of the intermediate carrying and cam plates. The first of these, the carrying-plate F, is provided with a sleeve, F', and is pierced with an orifice exactly fitting over the sleeve E' of the face-plate E. This plate E is also provided with a projecting lug, F'', having formed in it an elongated slot, $b$, through which passes an adjusting-screw into a corresponding lug, G'', upon the cam-plate G. This plate is provided with an elongated elliptical opening, whose least diameter is that of the sleeve E', thus allowing it to be moved to one side of the center, and causing the projecting rim G' to form an eccentric, the degree of eccentricity being determined by means of the graduated scales $c\ c'$ marked upon the lugs.

Sliding diametrically across the face-plate E, in a dovetailed groove, is the reciprocating carrier H, having a stud, I, securely attached to and protruding from its center. This stud carries the article to be turned, which may, as shown in the drawing, be a cutter suitable for forming moldings, or it may be any other article to which it is desired to give an oval form.

Each end of the carrier H is provided with a lug, H', projecting at right angles therefrom, and having between them and the rim G' of the cam-plate G, two adjustable bearing-blocks, J and J', which are kept in close contact with the rim by means of the adjusting-screws $d\ d$. Upon each side of the carrier H is placed a tightening-piece, K, secured to the chuck-plate by the tightening-screws $e$, which cause the tightening-pieces to bear against the beveled edges of the reciprocating carrier, and thus prevent any lost motion or displacement from the wear of the parts.

In order to prevent the cam-plate from revolving with the lathe-spindle and face-plate a holder is provided, which is clearly shown in Fig. 9, and which is composed of a hook, L, so constructed as to be slipped over the edge of the lathe-bed, and be retained in place by the track upon which the tool-rest moves, or it may be provided with a set-screw, and secured to the bed in any convenient position thereby. Secured to this hook by a swiveling-joint is the hand-nut M, which receives the threaded holder N. This holder is provided with an elongated slot, o, through which a screw passes, for the purpose of securing it to the lug F' of the plate F.

It will be evident that by this attachment the long diameter of the oval formed by the lathe may be changed, to a certain extent, by the operator, as, by turning the hand-nut M, thus elongating or contracting the holder, the position of the cam-plate is changed relatively to the cutting-tool, thus enabling the operator to bring the article to the right position, even when it has been placed at some distance from its proper location upon the stud I.

The operation of the tool will be clearly understood from the foregoing description, as it will be seen that while the chuck revolves, the cam-plate stands still, and being placed eccentrically to the chuck, produces a reciprocating motion of the carrier H, which is continued during each revolution of the lathe-spindle, thus causing the opposite sides of the article being turned to have the same oval form departing from a true circle.

Having thus described my invention, I claim as new, and desire to secure by Letters Patent, the following:

1. The combination and arrangement of the back plate D, carrying-plate F, cam-plate G, and face-plate E, as and for the purpose specified.

2. The reciprocating carrier H, provided with the stud I, in combination with the cam and carrying plates of the chuck, as set forth.

3. The adjustable holder, composed of the hook L, hand-nut M, and slotted screw N, as and for the purpose specified.

4. The oval-turning chuck herein described, in combination with the adjustable holder, and a lathe-bed, as and for the purpose set forth.

In testimony that I claim the foregoing I hereunto affix my signature in the presence of two witnesses.

MYRON T. BOULT.

Witnesses:
M. H. CHANDLER,
JAS. A. TAIT.